United States Patent [19]

Schylander et al.

[11] Patent Number: 5,530,686
[45] Date of Patent: Jun. 25, 1996

[54] RECORD CARRIER HAVING A TRACK INCLUDING AUDIO INFORMATION AND ADDITIONAL NON-AUDIO INFORMATION, AND APPARATUS FOR READING AND/OR REPRODUCING CERTAIN OF THE INFORMATION INCLUDED IN SUCH A TRACK

[75] Inventors: Erik C. Schylander, Veldhoven, Netherlands; Björn Bluthgen, Celle, Germany

[73] Assignee: U.S. Philips Corporation, New York, N.Y.

[21] Appl. No.: 417,489

[22] Filed: Apr. 5, 1995

Related U.S. Application Data

[63] Continuation of Ser. No. 977,396, filed as PCT/NL92/00108, Jun. 22, 1992, published as WO93/01593, Jan. 21, 1993 abandoned.

[30] Foreign Application Priority Data

Jul. 5, 1991 [EP] European Pat. Off. ............... 91111228

[51] Int. Cl.$^6$ .................................................. G11B 17/22
[52] U.S. Cl. .......................... 369/32; 369/15; 360/78.04
[58] Field of Search .................................. 369/32, 15, 13, 369/14, 44.14, 44.28, 83, 134, 48, 47, 49, 59; 360/78.04, 19.1, 72.2, 18; 358/341, 342, 343

[56] References Cited

U.S. PATENT DOCUMENTS

| | | | |
|---|---|---|---|
| 4,893,193 | 1/1990 | Nakamura et al. | 358/341 |
| 4,939,714 | 7/1990 | Yamagishi et al. | 369/59 |
| 4,992,885 | 2/1991 | Yoshio | 358/341 |
| 5,119,353 | 6/1992 | Asakura | 369/13 |

FOREIGN PATENT DOCUMENTS

| | | |
|---|---|---|
| 0277019 | 8/1988 | European Pat. Off. |
| 0339929 | 11/1989 | European Pat. Off. |
| 0453108 | 10/1991 | European Pat. Off. |
| 0465246 | 1/1992 | European Pat. Off. |
| 0142028 | 2/1989 | Japan . |
| 0133728 | 2/1989 | Japan . |

Primary Examiner—Ali Neyzari
Attorney, Agent, or Firm—Richard A. Weiss

[57] ABSTRACT

A record carrier having addressable information included thereon, including at least one track having audio information and additional non-audio information (e.g., CD-I information), and apparatus for reading and/or reproducing certain of the information included in such a track. That track includes (a) a prepart having (i) the additional non-audio information and (ii) pause information (which results in reproduction of silence) and (b) an audio part having the audio information. The additional non-audio information is located before the pause information, and the prepart is located before the audio part. The apparatus can determine whether a track of a record carrier having audio information included therein also includes additional non-audio information and/or can prohibit reproduction of the additional non-audio information.

29 Claims, 4 Drawing Sheets

RECORD CARRIER HAVING A TRACK INCLUDING AUDIO INFORMATION AND ADDITIONAL NON-AUDIO INFORMATION, AND APPARATUS FOR READING AND/OR REPRODUCING CERTAIN OF THE INFORMATION INCLUDED IN SUCH A TRACK

This is a continuation of prior application Ser. No. 07/977,396, filed as PCT/NL92/00108, Jun. 22, 1992, published as WO93/01593, Jan. 21, 1993 now abandoned.

BACKGROUND OF THE INVENTION

The invention relates to a record carrier on which addressable information including at least one audio track, and a table of contents have been recorded. The audio track includes a prepart having pause information which results in a reproduction of silence when played and an audio part having audio information which results in the reproduction of audio when played, the prepart being located directly before the audio part. The table of contents includes address information indicating the start location of the audio part of the audio track. A record carrier of the type just described is the so-called CD-audio disc.

There exists a need for recording additional information together with the audio information on an audio record carrier. This additional information may be information which enables interactive access of the audio information recorded on the record carrier. However, this additional information may also be other types of information, such as, text or image information to be displayed during the reproduction of the audio information. A known format for recording these types of additional information is the so-called CD-I format. The CD-I format makes it possible to record both a track with additional information (i.e., CD-I information) and an audio track with a format which corresponds with the format of the audio tracks as prescribed by the CD-audio standard.

When additional (CD-I) information is recorded in the main channel of a CD-audio disc, it is prevented from being reproduced as audio information because it results in the production of noise. In some types of the CD-audio players presently in use, this prevention is realized by checking whether the disc is a CD-audio disc, and if it is not, inhibiting the playback of the disc.

Another disadvantage of a CD-I disc, as prescribed by the present version of the CD-I standard, is that the first track must be a CD-I track. This means that a CD-audio track on a CD-I disc cannot be indicated with track number "1". This may result in the ordinary user being confused because he will expect the track with track number "1" to be the first (audio) program track on the disc.

SUMMARY OF THE INVENTION

It is an object of the invention to provide an audio record carrier on which additional information has been recorded such that the record carrier can be played by a dedicated player which uses the additional information for control of reproduction and which can also be played by means of audio players without resulting in an undesired production of noise caused by the read-out of the additional information. According to the invention, this object is achieved by a record carrier as defined in the opening paragraph, characterized in that the prepart includes additional information located before the pause information.

The record carrier according to the invention does not contravene the requirements as prescribed in the CD-audio standard. So a CD-audio player will be able to play a CD-disc with the characteristics of the record carrier according to the invention. Further, such a disc is allowed to indicate a track with audio information as track "1".

In the present invention, advantageous use is made of the fact that, in an audio player for playing a record carrier as defined in the opening paragraph, usually a track jump is made to a part of the audio track just before the beginning of the audio part. That part (i.e., the part just before the audio part) comprises pause information. As a result, silence is reproduced until the audio part is reached.

Due to the track jump, the part with the additional information is skipped. Preferably the additional information is included in the prepart of the first audio track of the sequence of audio tracks recorded on the disc. However in principle, it is also possible to include additional information in the prepart of the other tracks.

A known feature of the present CD-audio players is a so-called "Reverse Scan". When using this feature in combination with a record carrier according to the invention, a user may pass the start location of the first track. In order to reduce the chance that this will result in a production of noise caused by the playback of the additional information, it is preferred that the length of the part with pause information be substantial longer than the minimum length prescribed by the CD-audio standard, which minimum length corresponds to two seconds of playing time. A length of the part with pause information which corresponds to at least thirty seconds of playing time is suitable. However, a length which substantially corresponds to at least one hundred and twenty seconds is recommended.

Reproduction of undesired noise can also be prevented by means of an audio player which plays a record carrier according to the invention. Such a player is provided with a read unit for reading information from the record carrier, a unit for supplying an audio signal representing the audio information read out to an audio signal output of the player, and a unit for preventing the additional information from being is supplied to the audio signal output.

The invention is suitable for providing a CD-disc with both audio information and CD-I information. A CD-disc according to the invention can be played by both a usual CD-audio-player and a CD-I player. However it is to be noted that the invention is not limited to the use in CD-discs. In principle, the invention can be used in every record carrier of a type in which the audio part is preceded by a pause part and in which the start location of the audio part is indicated on the record carrier.

Access to the additional information can be easily obtained by a player which is provided with a read unit for reading information from the record carrier and a search unit for performing track jumps under the control of a control unit. The control unit is adapted to cause a read out of the table of contents prior to the start of the playing of the audio tracks, to select on the basis of the table of contents a part of the information to be read by the read unit and to cause the search unit to perform a track jump to the selected part of the information. In particular, the control unit is adapted to detect on the basis of the information in the table of contents whether a prepart of an audio track exceeds a predetermined length and to cause the search unit to perform a track jump to the additional information in the prepart, in the event that the length of the prepart exceeds the predetermined length.

BRIEF DESCRIPTION OF THE DRAWINGS

The invention will be explained hereinafter in detail with reference to the following drawings, in which.

DESCRIPTION OF THE PREFERRED EMBODIMENTS

Figure 1:
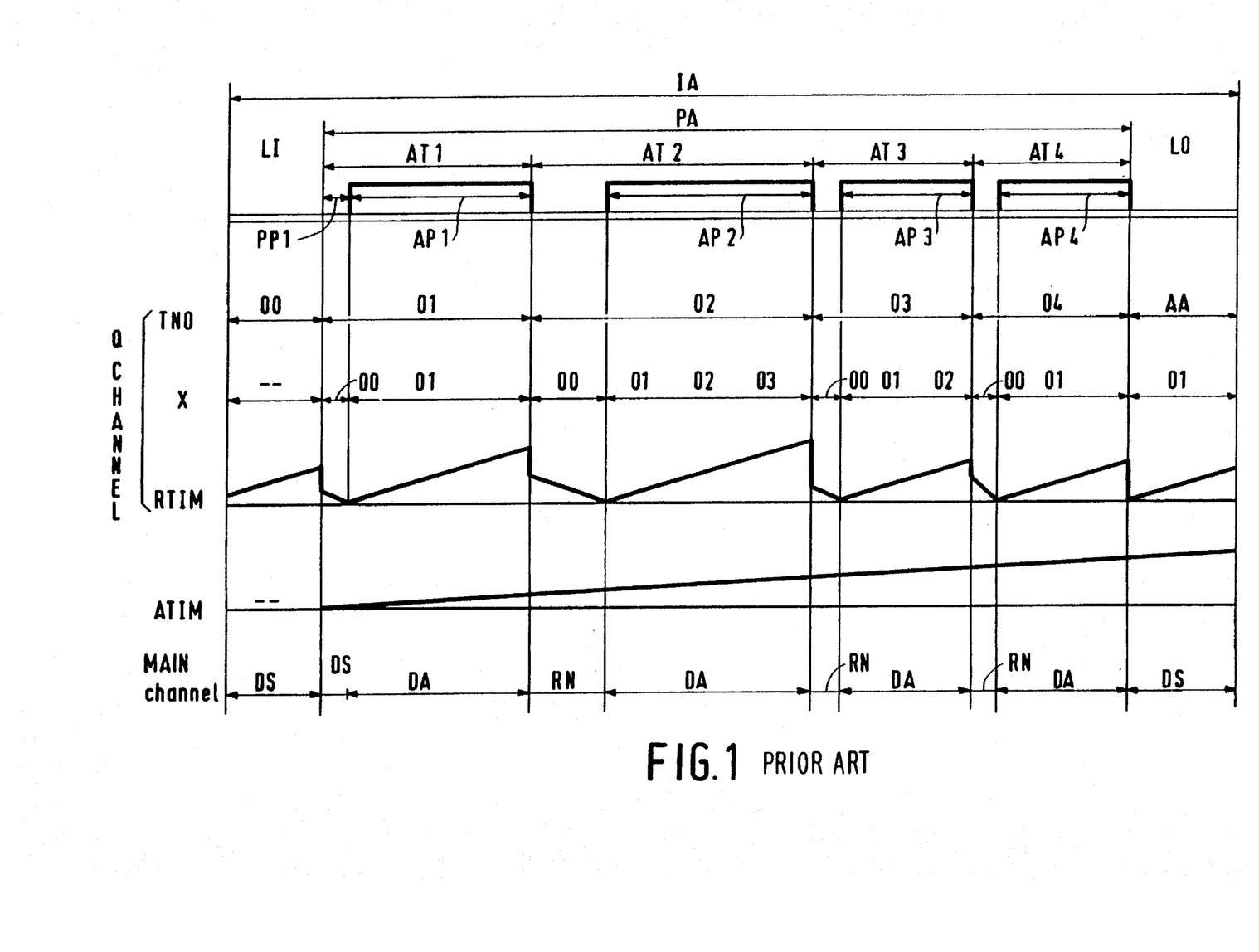
FIG. 1 shows the lay-out of a prior art CD-audio disc.

FIG. 1 shows the lay-out of a typical CD-audio disc. The area of the disc in which information has been recorded is indicated as the information area IA. The information area IA is divided into a lead-in area LI, a program area PA and a lead-out area LO.

The program area PA of FIG. 1 comprises four audio tracks, indicated by AT1, AT2, AT3 and AT4. Each audio track comprises an audio part in which audio information has been recorded. The audio parts are indicated as AP1, . . . AP4.

The CD-audio standard prescribes that the audio track AT1 comprises a prepart PP1 that directly precedes the audio part AT1. In the prepart PP1, pause information is recorded which results in a reproduction of silence when played. Such information will be hereinafter referred to digital silence.

The audio information and the digital silence in the audio tracks are included in a so-called main channel. In FIG. 1, the part of the main channel provided with digital silence has been indicated with DS. The audio parts of tracks AT1, . . . , AT4 may be separated by digital silence DS or so called room noise. Room noise is a digitized analog silence signal. The parts of the disc of FIG. 1 with the room noise are indicated with RN. The parts provided with audio information are indicated with DA. The lead-in area LI and the lead-out area LO of the main channel are also provided with digital silence DS.

In a so-called subcode Q channel, control information is included. In the program area PA, the subcode Q channel includes address information in the form of absolute time codes, ATIM, indicating the playing time expired from the beginning of the program area PA. The values of the absolute time codes ATIM as a function of the position within the program area PA is shown in FIG. 1. Further, in the program area PA, the subcode Q channel includes a track number code TNO, an index code X and a relative time code RTIM. In the prepart of the audio tracks, the index code X has the value 00. The audio part of the audio track starts with the index value 01. The values of TNO, X and RTIM are shown in FIG. 1. In the lead-in area LI, the subcode Q channel comprises a table of contents TOC, which has a format as prescribed by the CD-audio standard. The table of contents TOC includes the absolute time codes ATIM indicating the start location of the audio parts AP1, . . . , AP4 of the tracks. Further, the table of contents TOC includes an indication that the disc is a CD-audio disc.

When a CD-audio disc is played by a usual CD-player, the CD-player first reads the table of contents TOC. Then, the CD-player detects, on the basis of the contents of TOC, whether the disc is a CD-audio disc. In some types of CD-audio players, the playback of the program area PA is inhibited in the event that it is detected that the disc loaded in the player is not a CD-audio disc. However, if the presence of a CD-audio disc is detected, then a track jump to a part of the disc just before the start location of the audio part of the first audio track or a user selected audio track is performed. In doing the track jump, the information included in the table of contents TOC is used to determine the destination of the track jump. After the track jump, the scanning spot of the CD-player lands just before the start location of the audio part of the desired audio track. Since pause information has been recorded at the landing location of the scanning spot, silence or room noise will be reproduced for a short time until the scanning spot reaches the starting location of the audio information.

Figure 2:
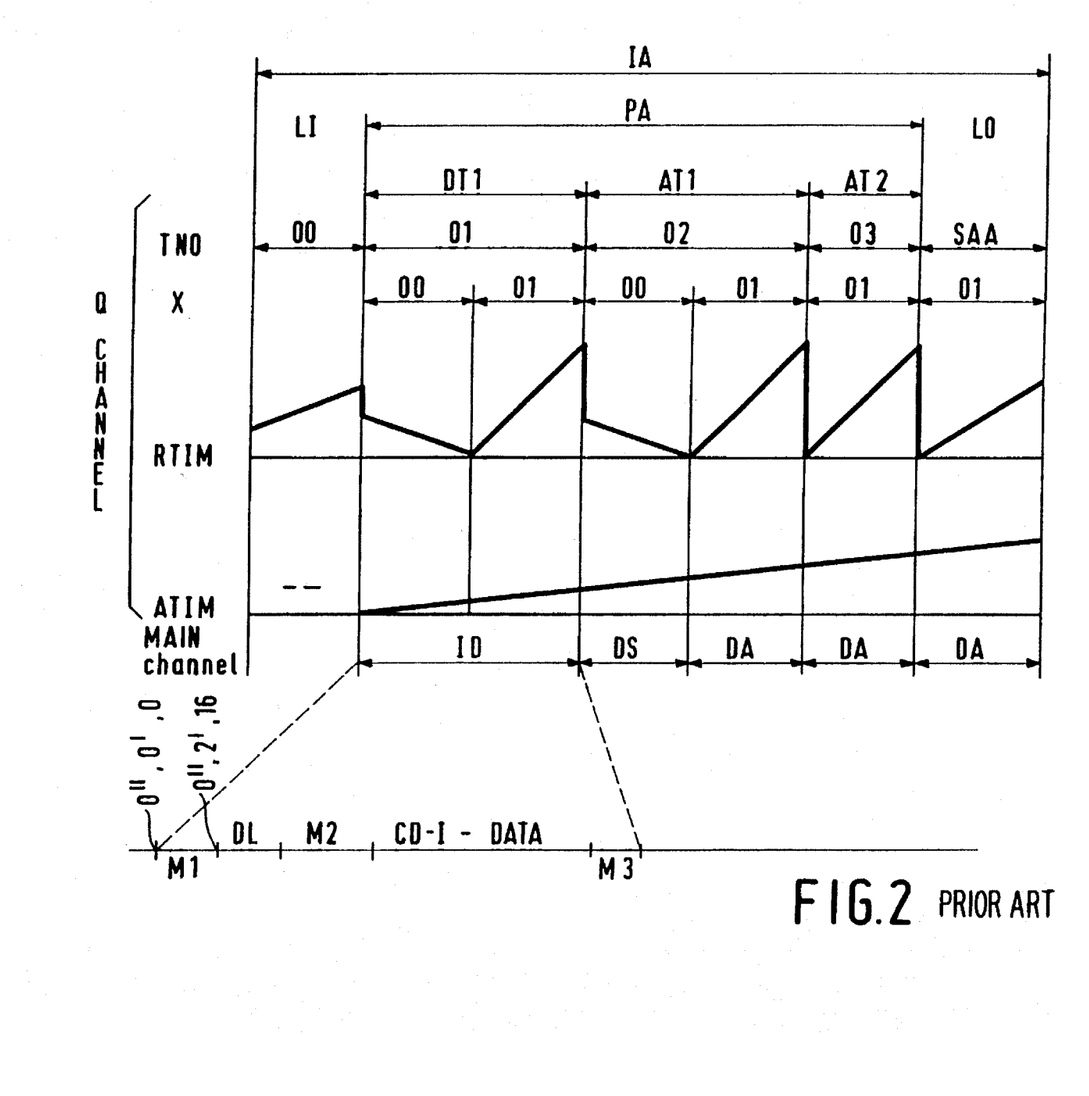
FIG. 2 shows the lay-out of a prior art CD-I disc.

FIG. 2 shows the lay-out of a typical CD-I disc. The CD-I disc of FIG. 2 has an information area IA which is divided in the same manner as the CD-audio disc into a lead-in area LI, a program area PA and a lead-out area LO. As prescribed by the CD-I standard, the first track in the program area is always a CD-I track, indicated by DT1 in FIG. 2.

The CD-I track of FIG. 2 comprises a message area M1 which corresponds to data sectors with addresses beginning at 0",0',0 and ending before 0",21',16 A so-called disc label DL starts thereafter with a data sector with address 0",2', 16. The disc label DL is followed by a message area M2. The message area M2 is followed by a part of the disc with CD-I information. The CD-I track may be followed by one or more audio tracks (e.g., AT1 and AT2 as in FIG. 2) with a format as prescribed by the CD-audio standard. A so-called message area M3 follows the CD-I information within the section DT1 in the event that track AT1 comprises Pulse Code Modulated audio information.

The values of TNO, X, RTIM and ATIM included in the subcode Q channel are shown in FIG. 2.

The lead-in area LI of the CD-I-disc of FIG. 2 includes a table of contents TOC which has a format as prescribed in the CD-I standard. The table of contents TOC includes an indication that the disc is a CD-I disc. Further, the table of contents includes the start locations of the audio parts of the audio tracks. The addresses of the CD-I tracks are not included in the table of contents.

When a CD-I disc is loaded into an usual CD-audio player, the player will detect, on the basis of the table of contents TOC, that the disc loaded is CD-I disc. In response to such a detection, some types of CD-audio players will inhibit the read-out of the program area PA of the CD-I-disc. This is done because the read-out of the CD-I tracks in the program area PA would result in an undesired production of noise. Such inhibition of the read-out of the program are PA also means that the audio tracks on the CD-I-disc, which in principle are readable by the CD-audio player, will not be played back by those types of CD-audio players.

Figure 3:
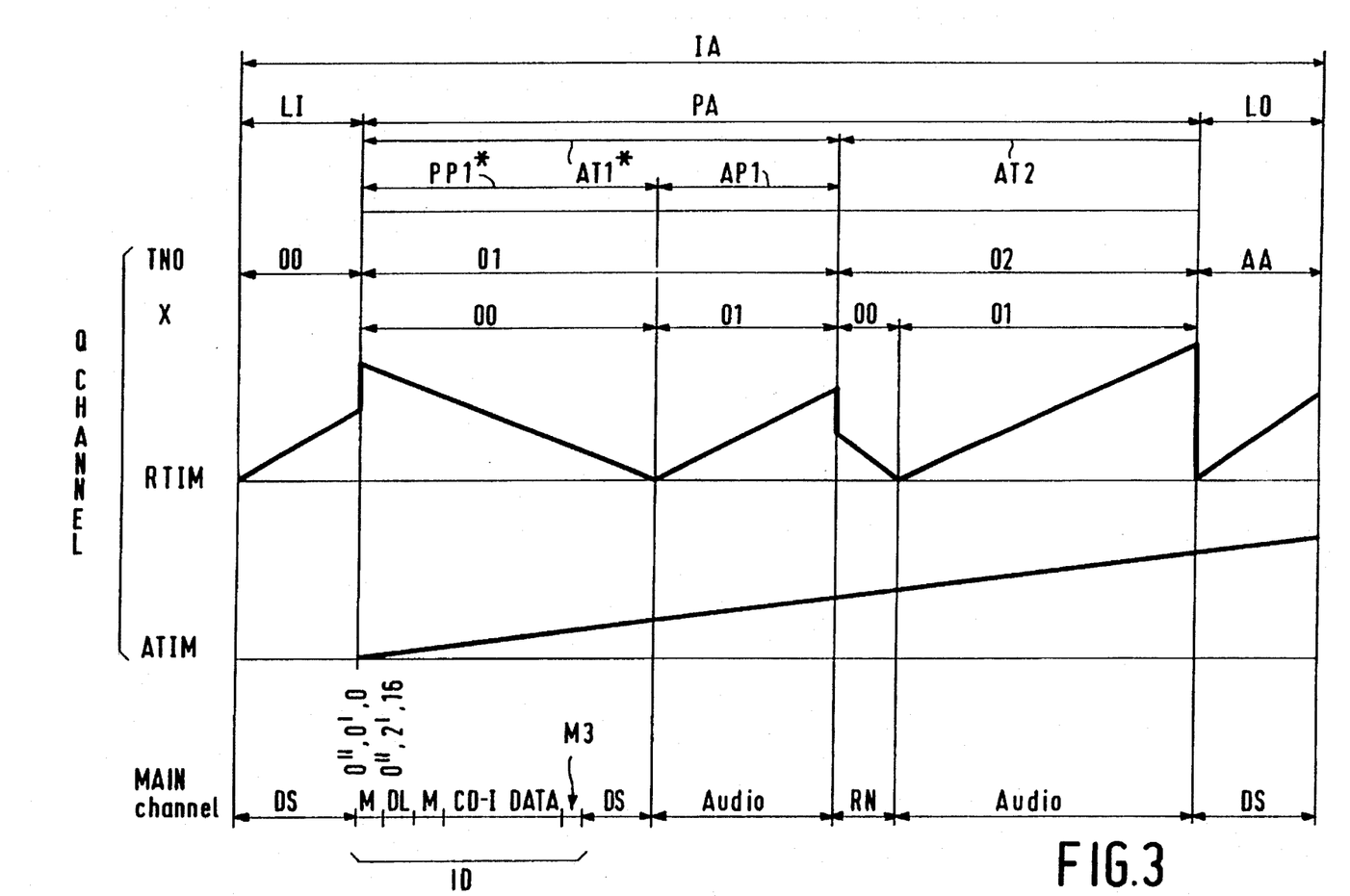
FIG. 3 shows the lay-out of a CD-disc according to the invention.

FIG. 3 shows a lay-out of a disc according to the invention in which both CD-I information and audio tracks included thereon can be read without problems by means of a usual CD-audio player. In the embodiment according to the invention shown in FIG. 3, the first track in the program area PA thereof is an audio track AT1 with an extended prepart PP1. The extended prepart PP1* comprises a part with digital silence DS which directly precedes an audio part AP1. The values of TNO, RTIM, X and ATIM for the disc of FIG. 3 are shown in the FIG. 3. It is preferable to set a so-called "control bit group" in the subcode Q-channel of the disc of FIG. 3 to a value (00XX), which corresponds with the usual setting in a CD-audio disc. In the extended prepart PP1*, a so-called subcode P-channel flag is set to "1". That channel flag is set to "0" at the start location of the audio part AP1.

The digital silence DS in the extended prepart PP1* of the disc of FIG. 3 is preceded by a part with additional (CD-1) information, in the main channel (which has been formatted as a CD-I track), including a sequence of 2250 message sectors M3 at its end. The subcode Q channel of track AT1* includes information which has been formatted in accordance with the CD-audio standard.

The subcode Q channel in the lead-in area LI comprises a table of contents which has been formatted in accordance with the CD-audio standard. This means that the start locations of the audio parts of track AT1* and track AT2 are indicated in the table of contents TOC included in the lead-in area LI.

It is preferred that, with exception of the extended prepart PP1*, the CD disc according to the invention has a reformat which is the same as a normal CD-audio disc without additional (CD-I) information in the prepart of the first track. As a result, when a disc according to the invention is loaded into a usual audio-disc player, the disc is handled as a usual CD-audio disc (because the information in the lead-in area has been formatted in accordance with the CD-audio standard).

In order to play the first audio-track in the program area, a usual CD-audio player performs a track jump to a part of the disc just before the start location of audio part which is indicated in the TOC. In doing the track jump, the additional information in the extended prepart PP1* will be automatically skipped. The track jump lands within the track part in the extended prepart PP1* with digital silence DS, located directly before the start location of the audio part.

A known feature of the present audio players is a so-called "Reverse Scan". When a user uses this feature, it may result in passage of the start location of the audio part of the first track, resulting in arrival in the prepart of that first track. In order to reduce the chance that this result in production of noise caused by the play of the additional (CD-I) information in the extended prepart PP1* of a disc in accordance with the invention, it is preferred that the length of the part in the extended prepart PP1* with digital silence DS (before the start location of the audio part of the first track) be substantial longer than the minimum length of the part on the prepart with digital silence DS in the first track as prescribed by the CD-audio standard. That minimum length corresponds to two seconds of playing time. A length of the part in the extended prepart PP1* with digital silence DS when corresponds to at least thirty seconds of playing time is sufficient. However, a length of at least one hundred and twenty seconds is preferred.

Another solution to prevent the reproduction of noise caused by the play-back of the additional (CD-I) information in the extended prepart PP1* is to provide a CD-audio player having a unit for inhibiting a jump into the part in the extended prepart PP1* with the additional (CD-I) information. It is also possible to prevent the undesired production of noise by determining on the basis of the subcode information whether the part in the extended prepart PP1* with the additional (CD-1) information is read out. This may be done on the base of the value of the TNO and X in combination with the value RTIM. E.g., in the event that TNO is equal to "1" and X is equal to "00", then the reproduction can be inhibited for values of RTIM which are greater than the minimum length of the digital silence DS of extended prepart PP1* recorded before the starting location of the audio part of the first track.

Figure 6:
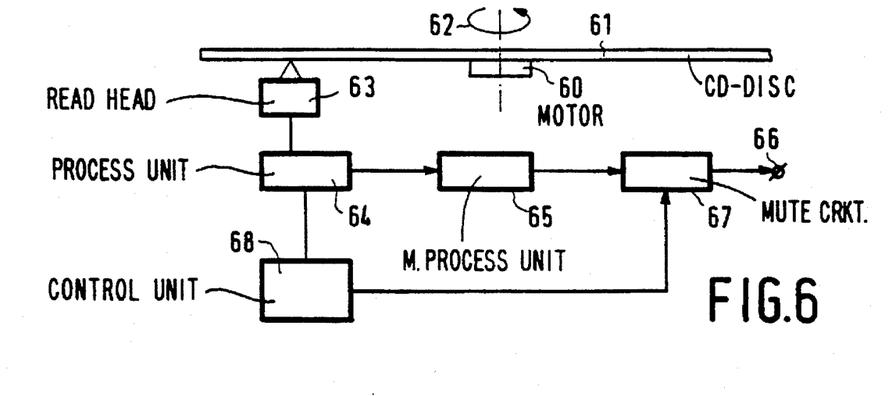
FIG. 6 shows an embodiment of an audio player according to the invention.

FIG. 6 shows by way of example an embodiment of a CD-audio player which is provided with a unit for preventing the reproduction of the additional (CD-I) information as audio information. The CD-audio player shown in FIG. 6 comprises a driving motor 60 for rotating a CD-disc 61 about an axis 62. An optical read head 63 of a usual type is located opposite to the rotating disc 61 for reading the information recorded on the disc 61. The read head 63 supplies detection signals representing the information read from the disc to a signal processing unit 64 of a usual type. The signal processing unit 64 recovers the information represented by the detection signals and separates the main information and the subcode information from one another. The main information is supplied to a main information processing unit 65, comprising a CIRC-encoder and EFM demodulator (not shown). The main signal processing unit 65 supplies a digital stereo audio signal to an output 66 through a muting circuit 67. The signal processing unit 64 supplies the subcode signal to a control unit 68. The control unit 68 may be, for example, of a program controlled type which is loaded with a suitable program for determining, on the basis of the subcode information, whether the additional (CD-I) information is read by the reading head 63. As described hereinbefore this may be done on the basis of the values of TNO, X and RTIM. In the event that the additional (CD-I) information is detected as having been read out, the control unit 68 actuates the muting circuit 67 via a signal line 69 so as to bring the muting circuit 67 in a mode in which it blocks the passage of the digital stereo audio signal.

It is noted that it will be clear to a man skilled in the art that other solutions exist for preventing the reproduction of noise caused by the read out of the additional (CD-I) information. As already mentioned hereinbefore, this can be done by inhibiting jumps into the track part in the extended prepart PP*1 with the additional CCD-I information.

When a disc with a lay-out as described with reference to FIG. 3 is loaded in a CD-I player, the player has to check whether CD-I information has been recorded on the disc. Since the table of contents in the lead-area of the disc corresponds with the format as prescribed by the CD-audio standard, the table of contents does not include an indication that the disc containing CD-I information. As a result, a check as to whether the disc contains CD-I information cannot be made on the basis of the indication usual available in the table of contents of a CD-I disc. Nevertheless, a CD-disc according to the invention can be distinguished from a CD-audio disc without additional (CD-I) information being added as will be explained below.

According to the CD-I standard, must be terminated with at least thirty seconds of message sectors. This means that the extended prepart PP1* of a disc in accordance with the invention always has a length which exceeds thirty seconds playing time. This property can be used by a CD-I player to distinguish a CD disc with additional (CD-I) information in the prepart of the first audio track from an usual CD-audio disc without additional (CD-I) information.

On the basis of the information in the table of contents TOC, it can be determined whether the audio part of the first track has a start location which is more than thirty seconds from the beginning of the program area PA. If so, then the sectors reserved for the disc label DL can be read, and on the basis of the contents of the disc label DL, the presence of additional (CD-I) information in the prepart can be determined.

Figure 4:
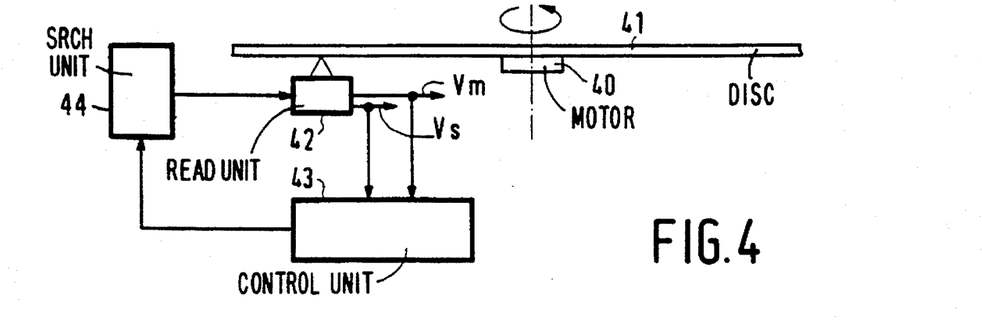
FIG. 4 shows an embodiment of a player according to the invention.

FIG. 4 shows an embodiment of a player according to the invention with which a disc according to the invention can be distinguished from a CD-audio disc without additional (CD-I) information in the prepart of the first audio track. The player comprises a driving motor 40 for rotating a compact disc 41. The player comprises a read unit 42 of a usual type for reading the information recorded on the part of the disc 41 scanned by the read unit 42. The read unit 42 delivers a signal Vm, which represents the information in the main channel of the information read, and a signal Vs, which represents the information in the subcode Q channel of the information read. The signal Vs and Vm are supplied to a control unit 43. The player is further provided with a search unit 44. The search unit 44 is of a usual type which is arranged to perform, under control of the control unit 43, track jumps to a part of the disc in which information specified by the control unit 43 is located. The control unit 43 may be of a program controlled type loaded with a suitable program for controlling the track jumps. A flow diagram of an embodiment of such program is shown in FIG. 5.

Figure 5:
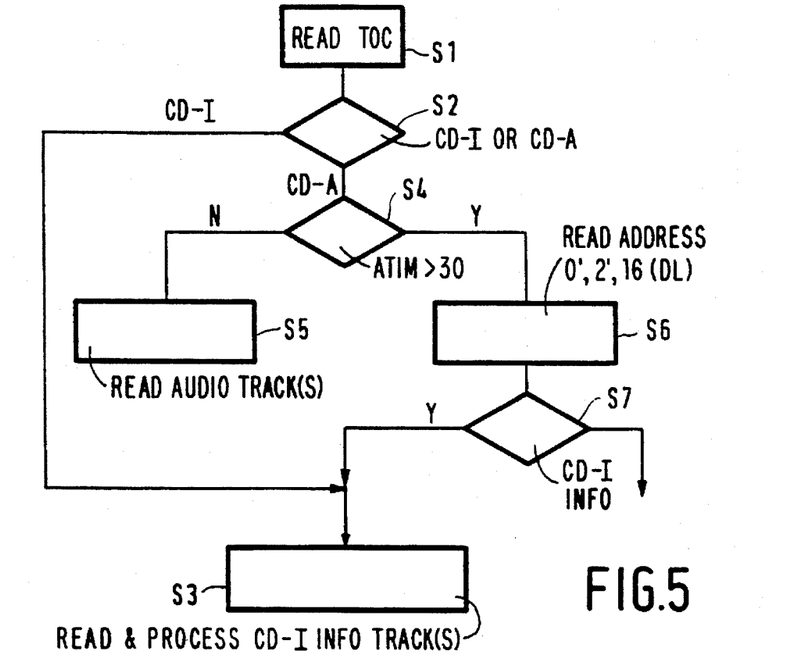
FIG. 5 shows a flow diagram of a program of a program controlled control unit used in the player of FIG. 4.

The flow diagram of FIG. 5 comprises a first step S1. In step S1, the read unit 42 is controlled to read the table of contents TOC recorded in the lead-in area LI of a CD-disc. In a step S2, a determination is made as to whether the disc read is indicated as a CD-audio disc or as a CD-I disc on the basis of the table of contents TOC. If a CD-I disc is detected in step S2, it is followed by step S3. In step S3, the track or tracks with CD-I information are searched, read and processed. If a CD-audio disc is detected in step 3, then step S4 is performed. In step S4, it is determined whether the absolute time code ATIM indicating the start location of the audio part of the first audio track indicated in the table of contents TOC exceeds a predetermined value, e.g. thirty seconds. If not, than step S5 is performed. In this step S5, the audio tracks are searched and read. If in step S4, it is determined that the absolute time code indicating the start location of the audio part of the first track exceeds the predetermined value, step S6 is performed. In step S6, the sectors reserved for the disc label DL are read. In step S7, on the basis of the contents of the disc label DL, it is determined whether the disc has additional (CD-I) information in the prepart of the first audio track. If it does, then step S7 is followed by step S3.

It is noted that in principle step S4 is not required. It is also possible to read the sectors reserved for the disc label DL after it is determined, on basis of the table of contents, that the disc is a CD-audio disc. If a disc label DL is present in these sectors, then the disc is not a normal CD-audio disc. On the basis of the contents of the disc label, it can be determined whether the disc is of a type which includes additional (CD-I) information in an extended prepart of the first track.

The embodiment described hereinbefore relates to CD-audio disc in which additional information, such as CD-I information, is recorded in the prepart (i.e., an extended prepart) of the first audio track. However, it is to be noted that the invention is not limited to these embodiments. It is also possible to record the additional information in preparts of audio tracks other than the first track. Further it is possible to record other types of additional information other than CD-I information in the prepart. Finally it is remarked that the invention can also be used for record carriers other than CD-discs.

We claim:

1. A record carrier having addressable information included thereon, the record carrier comprising:

a lead-in area; and a first track adjoining the end of the lead-in area, the first track including (a) an audio part having audio information which when reproduced results in production of audio; and (b) a prepart having (i) pause information which when reproduced results in production of silence, and (ii) additional non-audio information which is a different type of information than the pause information and which precedes the pause information, the prepart being located directly prior to the audio part.

2. The record carrier as claimed in claim 1, wherein the lead-in area includes a table of contents including address information indicating the start location of the audio part.

3. The record carrier as claimed in claim 2, wherein the record carrier is a CD-audio disc except for the additional non-audio information included in the prepart, and the audio information and the table of contents have been recorded in accordance with the CD-audio standard.

4. The record carrier as claimed in claim 3, wherein the pause information has a length which is substantially longer than the minimum length prescribed by the CD-audio standard.

5. The record carrier as claimed in claim 4, wherein the length of the pause information exceeds a length which corresponds to one hundred and twenty seconds of reproduction time.

6. The record carrier as claimed in claim 3, wherein the additional non-audio information has been formatted in accordance with a CD-interactive standard and includes disc label information at a predetermined address location on the record carrier.

7. The record carrier as claimed in claim 2, wherein the additional non-audio information has been formatted in accordance with a CD-interactive standard and includes disc label information at a predetermined address location on the record carrier.

8. The record carrier as claimed in claim 1, wherein the additional non-audio information has been formatted in accordance with a CD-interactive standard and includes disc label information at a predetermined address location on the record carrier.

9. The record carrier as claimed in claim 1, further comprising at least two successive tracks, wherein the first of the at least two successive tracks is the first track.

10. An apparatus for reproducing certain of the information included on the record carrier claimed in claim 1, the apparatus comprising:

read means for reading at least some of the information included on the record carrier;

reproducing means for producing audio in accordance with certain of the information included on the record carrier; and inhibiting means for preventing audio in accordance with the additional non-audio information from being produced by said reproducing means.

11. An apparatus for reproducing certain information included on a record carrier having addressable information included thereon, including (a) a table of contents and (b) tracks which each include an audio part having audio information which when reproduced results in production of audio, at least one of the tracks further including a prepart having (i) pause information which when reproduced results in production of silence and (ii) additional non-audio information which is a different type of information than the pause information, the apparatus comprising:

read means for reading at least some of the information included on the record carrier;

reproducing means for producing audio in accordance with at least some of the information included on the record carrier; and inhibiting means for preventing audio in accordance with the additional non-audio information from being produced by said reproducing means.

12. The apparatus as claimed in claim 11, further comprising control means for detecting, on the basis of the table of contents, whether a track of the record carrier has a prepart which exceeds a predetermined length, indicating that that track includes the additional non-audio information in the prepart thereof.

13. The apparatus as claimed in claim 11, further comprising control means for detecting, on the basis of the table of content and information included at a predetermined address location on the record carrier, whether a first track of the record carrier has a prepart with the additional non-audio information included therein.

14. An apparatus for reading a record carrier having addressable information included thereon, including (a) a table of contents and (b) at least one track having (i) a prepart including pause information which when reproduced results in production of silence, and (ii) an audio part including audio information which when reproduced results in production of audio, the apparatus comprising:

read means for reading the information included on the record carrier;

search means for performing track jumps to locations on the record carrier in which information included thereon is located; and control means for (a) causing said read means to read the table of contents, (b) for selecting, on the basis of the table of contents, a portion of the information included on the record carrier which is to be located, and (c) for causing said search means to perform track jumps to locations on the record carrier in which the portions of the information included on the record carrier selected are located;

wherein said control means is adapted to detect, on the basis of the table of contents, whether the prepart of the at least one track exceeds a predetermined length, indicating that the track includes additional non-audio information in the prepart thereof.

15. The apparatus as claimed in claim 14, wherein said control means is further adapted to cause said search means to perform a track jump to the additional non-audio information in the prepart of the at least one track in the event that the length of the prepart of that track exceeds the predetermined length.

16. An apparatus for reading a record carrier having addressable information included thereon, including (a) a table of contents and (b) tracks which each include an audio part having audio information which when reproduced results in production of audio, a first one of the tracks further including a prepart having pause information which when reproduced results in production of silence, the apparatus comprising:

read means for reading the information included on the record carrier;

search means for performing track jumps to locations on the record carrier in which information included thereon is located; and control means for (a) causing said read means to read the table of contents, (b) for selecting, on the basis of the table of contents, a portion of the information included on the record carrier which is to be located, and (c) for causing said search means to perform track jumps to locations on the record carrier in which the portions of the information included on the record carrier selected are located;

wherein said control means is adapted to detect, on the basis of the table of contents and information located at a predetermined address location on the record carrier, whether the first one of the tracks has additional non-audio information in the prepart thereof.

17. The record carrier as claimed in claim 9, wherein each of the at least two successive tracks includes an audio part therein having audio information which when reproduced results in production of audio.

18. The apparatus as claimed in claim 11, wherein the prepart in the at least one track precedes the audio part in that track, and the additional non-audio information in the prepart precedes the pause information in the prepart.

19. The apparatus as claimed in claim 11, wherein the record carrier further includes a lead-in area including the table of contents, and the at least one track is a first track on the record carrier which adjoins the end of the lead-in area.

20. The apparatus as claimed in claim 13, wherein the predetermined address location is a location on the record carrier where disc label information is included in a record carrier having such disc label information.

21. An apparatus for reproducing certain information included on a record carrier having addressable information included thereon, including (a) a table of contents and (b) tracks which each include an audio part having audio information which when reproduced results in production of audio, at least one of the tracks further including a prepart having pause information which when reproduced results in production of silence, the apparatus comprising:

read means for reading at least some of the information included on the record carrier;

reproducing means for producing audio in accordance with at least some of the information included on the record carrier;

control means for detecting, on the basis of the table of contents, whether a track of the record carrier has a prepart with additional non-audio information, which is a different type of information than the pause information, included therein; and inhibiting means for preventing audio in accordance with additional non-audio information from being produced by said reproducing means.

22. The apparatus as claimed in claim 21, wherein said control means is adapted to detect, on the basis of the table of contents, whether a track of the record carrier has a prepart which exceeds a predetermined length, indicating that that track includes the additional non-audio information in the prepart thereof.

23. The apparatus as claimed in claim 21, wherein the record carrier further includes a lead-in part including the table of contents, and said control means is further adapted to detect, on the basis of the table of contents, whether a first track adjoining the end of the lead-in area has a prepart which exceeds a predetermined length, indicating that the first track includes additional non-audio information in the prepart thereof.

24. The apparatus as claimed in claim 21, wherein said control mean is adapted to detect, on the basis of the table of contents and information included at a predetermined address location on the record carrier, whether a first track on the record carrier has a prepart with the additional non-audio information included therein.

25. The apparatus as claimed in claim 24, wherein the predetermined address location is the location on the record carrier where disc label information is included on a record carrier having such disc label information.

26. The apparatus as claimed in claim 15, wherein the record carrier further includes a lead-in part including the table of contents, and said control means is further adapted to detect, on the basis of the table of contents, whether a first track adjoining the end of the lead-in area has a prepart which exceeds a predetermined length, indicating that the first track includes additional non-audio information in the prepart thereof.

27. The apparatus as claimed in claim 16, wherein the prepart in the first one of the tracks precedes the audio part therein, and the additional non-audio information in the prepart precedes the pause information in the prepart.

28. The apparatus as claimed in claim 16, wherein the record carrier further includes a lead-in area including the table of contents, and the first one of the tracks adjoins the end of the lead-in area.

29. The apparatus as claimed in claim 16, wherein the predetermined address location is the location on the record carrier where disc label information is included on a record carrier having such disc label information.

* * * * *